Patented Aug. 7, 1923.

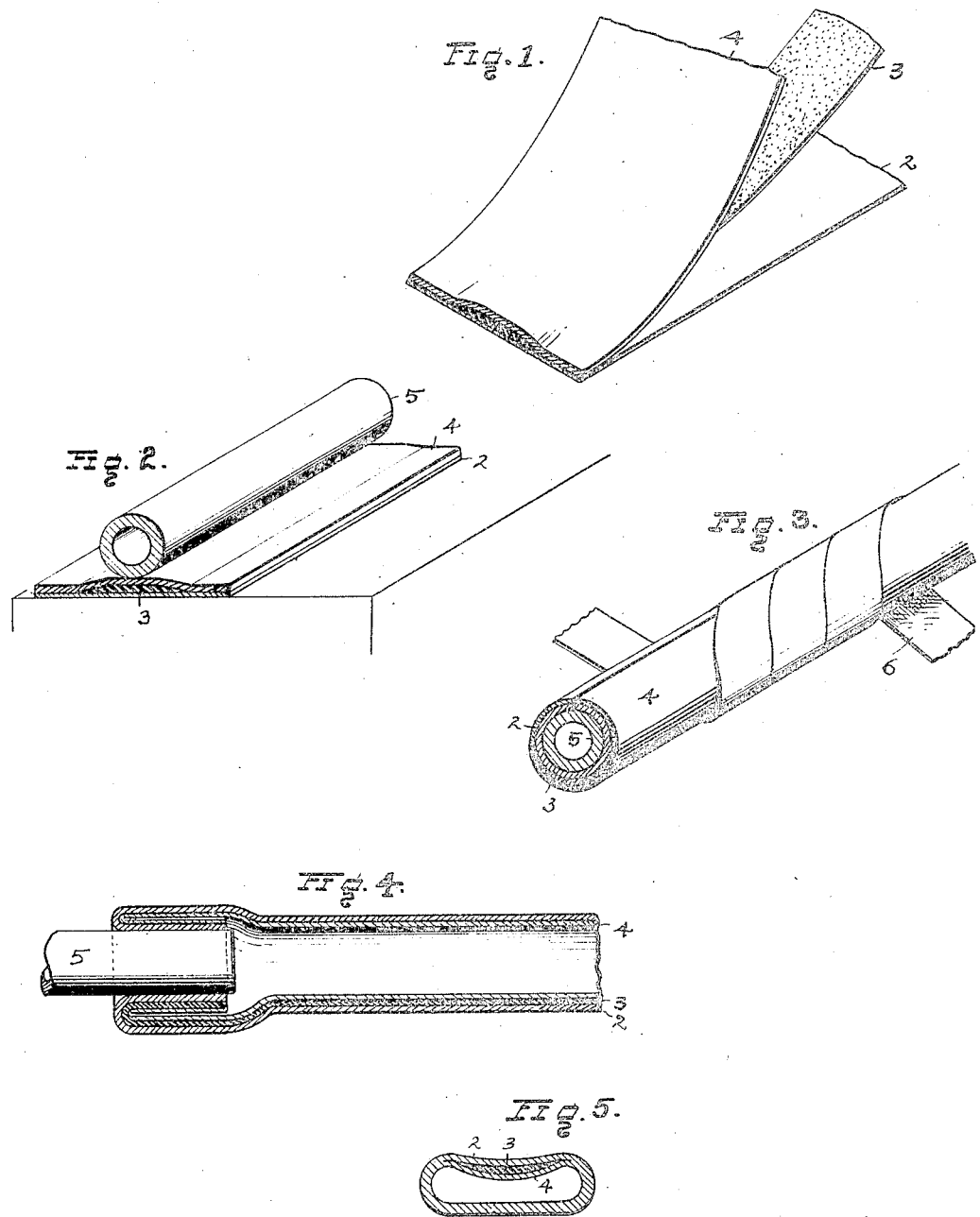

1,463,987

UNITED STATES PATENT OFFICE.

WILLIAM W. WILDMAN, OF BAY CITY, MICHIGAN, ASSIGNOR TO THE WILDMAN RUBBER COMPANY, OF BAY CITY, MICHIGAN, A CORPORATION OF DELAWARE.

MODE OF MANUFACTURING INNER TUBES.

Application filed June 16, 1921. Serial No. 478,055.

*To all whom it may concern:*

Be it known that I, WILLIAM W. WILDMAN, a citizen of the United States, residing at Bay City, in the county of Bay and State of Michigan, have invented certain new and useful Improvements in a Mode of Manufacturing Inner Tubes, of which the following is a specification.

The invention under consideration involves a facile way or mode of manufacturing inner tubes for pneumatic tires, and particularly inner tubes composed entirely of rubber in which a portion of the rubber is non-vulcanizable and adapted to seal cuts or punctures in the tread side of the tube.

The attached drawing illustrates the steps taken to make the tube, Fig. 1 being a perspective view showing the first steps of laying three plies or strips of rubber lengthwise one upon the other. Fig. 2 is a perspective view of a mandrel placed upon the assembled plies of rubber. Fig. 3 is a perspective view of the several plies folded or rolled around the mandrel, and showing a portion thereof compressed tightly within the spiral folds of a muslin wrapper. Fig. 4 is a sectional view, showing the tube being turned inside out while it is being stripped from the mandrel. Fig. 5 is a cross section of the finished tube showing its normal shape when not inflated.

In making this tube, a relatively long sheet or strip 2 of rubber of a predetermined width is laid flat upon a table, and this sheet of rubber contains sulphur or an equivalent vulcanizing ingredient. A second narrower strip 3 of rubber one-eighth to one-fourth of an inch in thickness is then laid lengthwise upon the middle portion of sheet 2, and this strip is made of raw crude gum or rubber in which no sulphur or vulcanizing ingredient has been added. A third sheet or strip 4 of vulcanizable rubber of approximately the same width but relatively thicker than the first strip 2 is then laid upon the strip 3 in overlapping position upon the exposed parts of bottom strip 2, all three pieces of rubber being of approximately the same length and also plastic and of a consistency to cause them to adhere to each other. The middle strip 3 is especially viscous or sticky and inasmuch as no vulcanizing substance is mixed therewith it remains in that condition after the other two strips have been vulcanized.

The next procedure is to place a round or other shaped mandrel 5 upon the top side of the assembled rubber strips and wrap, roll or fold the three strips jointly around the mandrel until the opposite longitudinal edges of the top and bottom strips abut or overlap to form a tube. A strip 6 of cloth is then wound tightly around the three rubber plies on the mandrel to place them jointly under compression, and the wrapped product is then placed within a suitable heater or vulcanizer until strips 2 and 4 are vulcanized throughout and homogeneously united at their meeting edges and faces. The raw gum 3 absorbs some of the vulcanizing material in the other two plies or rubber so that all three plies are actually united together while still leaving the inner or larger volume of crude rubber in its raw tacky state. The tube is then removed from the mandrel and turned inside out to stretch the elastic thicker ply 4 of rubber around the outside of the interlayer 3 of crude adhesive rubber, thereby placing the adhesive rubber in a constant state of compression. The turned tube is then spliced at its opposite ends to form an annular or ring-shaped tube of the desired diameter for use within a tire-casing having a corresponding inner diameter. An air valve is also affixed to the tube in the customary way to permit the tube to be inflated and used in pneumatic tire casings of any description.

A tube made according to this method is more durable and lasting than the inner tubes in general use and can be produced nearly as cheaply, and in addition the tube possesses the valuable property and characteristic of sealing and repairing itself when punctured.

What I claim is:

A mode of manufacturing inner tubes for tires, consisting in laying a relatively long strip of rubber containing a vulcanizing substance upon a flat surface; in laying a second narrower strip of unvulcanizable rubber lengthwise upon said first strip; in superposing a third strip of vulcanizable rubber upon the other strips; in placing an elongated mandrel upon the top side of the assembled strips and folding said strips jointly around the mandrel until the opposite longitudinal edges are engaged and form a tube; in winding a strip of fabric tightly around the several plies of rubber on the mandrel; in subjecting the wrapped product to heat until the vulcanizable rubber is cured and all the said strips are homogeneously united at their meeting surfaces; in removing the vulcanized tube from the mandrel and turning it inside out to place the interlayer of unvulcanizable rubber in a constant state of compression; and in splicing the opposite ends of said tube together to form a ring-shaped tube adapted to be inflated.

WILLIAM W. WILDMAN.